(12) United States Patent
Bertolet

(10) Patent No.: US 6,752,141 B2
(45) Date of Patent: Jun. 22, 2004

(54) CIRCULAR CUT-OFF SAW BLADE

(75) Inventor: John B. Bertolet, East Douglas, MA (US)

(73) Assignee: PMI, Phoenix Metallurgical Incorporated, Hopedale, MA (US)

(*) Notice: Subject to any disclaimer, the term of this patent is extended or adjusted under 35 U.S.C. 154(b) by 0 days.

(21) Appl. No.: 10/430,622

(22) Filed: May 7, 2003

(65) Prior Publication Data

US 2003/0209125 A1 Nov. 13, 2003

Related U.S. Application Data

(60) Provisional application No. 60/378,742, filed on May 8, 2002.

(51) Int. Cl.[7] ................................................. B28D 1/12
(52) U.S. Cl. ........................................ 125/15; 451/542
(58) Field of Search .............................. 125/15, 13.01; 451/542, 541, 543

(56) References Cited

U.S. PATENT DOCUMENTS

| 1,723,843 | A |   | 8/1929  | Chapin         |        |
|-----------|---|---|---------|----------------|--------|
| 3,203,140 | A | * | 8/1965  | Hallez         | 125/15 |
| 3,981,216 | A |   | 9/1976  | Lemmon         | 83/848 |
| 4,575,676 | A |   | 3/1986  | Palkuti        | 31/26  |
| 4,665,887 | A |   | 5/1987  | Shiga          | 1/4    |
| 4,794,835 | A |   | 1/1989  | Fujiyoshi      | 33/8   |
| 4,854,295 | A |   | 8/1989  | Sakarcan       | 5/6    |
| 5,392,759 | A |   | 2/1995  | Kwang          | 1/12   |
| 5,438,900 | A |   | 8/1995  | Sundstrom      | 61/2   |
| 5,555,788 | A |   | 9/1996  | Gakhar et al.  | 61/2   |
| 5,839,423 | A |   | 11/1998 | Jones et al.   | 1/4    |
| 6,401,705 | B1 | * | 6/2002  | Suzuki        | 125/15 |
| 6,408,838 | B1 | * | 6/2002  | Ogata et al.  | 125/15 |

* cited by examiner

Primary Examiner—Robert A. Rose
(74) Attorney, Agent, or Firm—Brian M. Dingman, Esq.; Mirick, O'Connell, DeMallie & Lougee, LLP

(57) ABSTRACT

A circular cut-off saw blade with a circular body having a peripheral edge, a plurality of curved slots spaced along the peripheral edge, each slot having an open outer end connecting with the peripheral edge, and defined by essentially parallel, continuously-curved sidewalls leading away from the peripheral edge, and cutting segments fixed to the peripheral edge between each pair of adjacent slots.

20 Claims, 3 Drawing Sheets

CIRCULAR CUT-OFF SAW BLADE

CROSS REFERENCE TO RELATED APPLICATION

This application claims priority of Provisional application Serial No. 60/378,742, filed on May 8, 2002.

FIELD OF THE INVENTION

This invention relates to a circular saw blade.

BACKGROUND OF THE INVENTION

Diamond blades are used to cut a variety of hard, abrasive, difficult-to-cut materials, such as concrete, stone, asphalt, and brick. The cutting portion of the blade, called a "segment" is comprised of diamond abrasive grit particles held in place by a metallic matrix or "bond." In use, the diamond abrasive grit particles act like tiny cutting points; they are forced through the material being cut by the power of the saw machine, causing fracture of the parent material which produces the cutting action. As the diamond abrasive particles do the work, they slowly wear away and become dull or fractured. For the blade to keep cutting, the bond material must also wear away to expose new diamond particles. If the bond and diamond are correctly designed and matched to the material being cut, the blade will continue to cut until the entire segment is worn away.

There are two primary performance measures for a diamond blade:

1. Life—how much cutting can be done before the segment is gone; measured in inch-feet or square inches of cut. Life will vary depending on the material being cut.
2. Speed of Cut—how quickly the blade moves through the material; measured in inch-feet per minute or square inches per minute. Speed of cut also varies with the material being cut.

Increased life is typically achieved by using a bond material that is more wear resistant and/or increasing the amount (concentration) of diamond grit. Increased speed of cut is typically achieved by using a "softer" or faster wearing bond material and/or decreasing the amount (concentration) of diamond grit. Thus these two performance requirements compete with each other—to get longer life one must give up speed of cut, and vice-versa. This trade-off is generally accepted by the industry. However, the invention is a breakthrough in that it achieves increased speed of cut without sacrificing life through the physical design of the blade geometry.

SUMMARY OF THE INVENTION

This invention includes the geometry and spacing of the slots and segments around the periphery of a circular cut-off saw blade. The slots are designed to produce maximum airflow and cooling of the saw in use. The segments are designed to work with the slots to maximize the airflow and cooling effect of the slots. This blade design is intended primarily for dry-cutting applications. It may also offer advantages for wet-cutting applications.

Design features of the slots include the curvature of the slot and the angle of the outer opening of the slot with respect to a radial line. The radius of curvature of the slots generally ranges from 1" to 3". The curvature of the slots is optimized to work with a specific combination of saw diameter, number of slots/segments, saw operating speed, and other design parameters to produce the maximum airflow and cooling. The curvature of the slot imparts more energy to the surrounding fluid (air) than does a straight slot. The curvature and angle of the slots works with the rotation of the blade to produce outward airflow. There are many variations of the various parameters of the slot design. The slots may open to the periphery of the blade at an angle with respect to a radial line of from about 0° to about 30°. The center of curvature of the slots is preferably ahead of the leading edge of the sidewall relative to the correct direction of rotation of the saw blade, but is alternatively behind the leading edge. The direction of rotation works with the angle and curvature of the slots to produce outward airflow. This orientation of slots also produces a more stable blade during cutting. Other variations include the number of slots (preferably from 4–75); the width of the slots (preferably from about 0.125" to about 0.250"); the depth/length of the slots (preferably from about 0.5" to about 2"); the radius of curvature of the slots (preferably from about 1" to about 3"); and the use of more than one slot configuration on the same blade (for example, a mixture of longer and shorter or narrower and wider slots).

In the preferred embodiment of the invention, the curvature of the slots is such that as the blade advances (rotates) into static air, the innermost portion of the slot advances first, and is curved so that the direction of the slot is close to parallel with the direction it is traveling relative to the air. The air flows into the slot to fill the vacuum that would otherwise occupy the slot. As the blade continues to advance, the angle of the slot gradually changes toward a more radial angle; and the air is accelerated in a progressively more radial direction. Finally, as the slot exits the steel, the direction of the slot is radial, and the direction of the air flow is nearly radial.

Of the total circumference of the blade, a portion is covered by segments and a portion is used by the slots. The segments are in contact with the workpiece; in the slot area there is no contact. The total contact area can be expressed as a portion or percentage of the total peripheral area. Typical contact area values are in the range of 80–90% (of the full circumference). Blades with a lower contact area (in the range of 80–85% or less) typically act "softer", meaning that they cut faster and wear quicker, all other things being equal. Conversely, blades with a higher contact area (85–90% or above) typically act "harder", meaning that they cut slower and wear faster. With the lower contact area, there is more power per square inch of cutting area applied by the machine; this results in higher load per abrasive particle, which makes that particle bite into the work-piece more, but it also causes the abrasive to wear and break-down faster.

The preferred configuration of the inventive blade is toward the low end of the "conventional" range on peripheral contact area—approximately 80%. By keeping the peripheral contact area toward the low end of the range, there is a good amount of room for slots. The bigger the slot, the more air it can move. However, if the slots are too big, the peripheral area is too low, and the blade will wear too quickly. The aim is to have enough area for good life, and also achieve fast cut. Accordingly, in one respect, the size of the slots is optimized to give the best blend of a large slot for air-flow combined with adequate peripheral contact area for blade life.

The length and curvature of the slot is also optimized to give the largest slot possible without reducing the strength and stiffness of the core below an acceptable level. Obviously, the more material that is removed by making the slot larger, the weaker and more flexible the core will become. The preferred inventive design is a compromise on size of the slot versus strength and stiffness of the core.

The number and size (length) of the segments is also optimized to give fast cut, with efficient flushing of fines, without inducing excessively fast wear or choppy cut. Standard segment lengths that are common in the diamond blade industry are 2 inches (50 mm) and 40 mm (1.575 inch), though a wide variety of segment lengths have been used. Shorter segments can be used to reduce the peripheral area and increase the speed of cut; the tradeoff is shorter blade life and a "choppy" cut if the slots between the segments are excessively large. The length of the segments of the preferred embodiment herein is 1.250 inches, which provides for a high number of segments to yield the correct peripheral area and slots that are big enough to give the desired airflow effect without being so large as to produce a choppy cut. Variations contemplate segments in the 1.000–1.500 inch length range.

The invention also includes cutting segments in which the angle on the end of the segments is aligned either with radii of the blade (i.e., straight-edged segments), or aligned with the angle of the slot at the periphery, so that the edges of the segment effectively continue the slot sidewalls. There can be from 4 to 75 segments, depending on the blade diameter and the number of slots. Each segment is from about 1" to about 2" long. The invention can apply to blades having a nominal diameter of from about 4" to about 36".

The invention provides several operating advantages, including:

1. Cooler operation: The airflow cools the segments and the product being cut. This inhibits heat-induced damage to the diamond superabrasive, which would otherwise degrade the diamond particles and cause the blade to stop cutting. Current diamond blades perform very poorly in certain applications where a lot of heat is generated; and cooler-running blades generally cut faster and last longer.
2. Removal of fines: The increased airflow produces more effective removal of the fine material in the cut. Removal of the fines gives the diamond abrasive more direct contact with the parent material, which produces better cutting action. This results in faster cutting and/or longer blade life.
3. Longer blade life: The cooler running and better removal of fines make the blades last longer. This is particularly true in demanding applications where heat buildup and/or fines buildup are problems.
4. Faster cutting: The cooler running allows lower grade diamond to be used in the segments without fear of thermal degradation; lower grade diamond generally produces a faster cut.
5. Audible warning if mounted backwards: The curved slots make a different sound when operated in the opposite rotating direction; the sound of a blade that is mounted backwards is distinguishable from one that is mounted correctly.
6. Unique appearance: The design of the blade provides a unique appearance which makes the blades more easily visually distinguished from existing blades, which provides a clear product identity.

BRIEF DESCRIPTION OF THE DRAWINGS

Other objects, features and advantages will occur those skilled in the art from the following description of the preferred embodiments, and the accompanying drawings, in which.

DETAILED DESCRIPTION OF THE PREFERRED EMBODIMENTS

The invention may be accomplished in a circular saw blade that has a number of curved slots spaced along the peripheral edge of the blade. The slots are defined by essentially parallel, continuously-curved sidewalls. This blade exhibits substantially greater cutting rates than a similar blade with radial slots.

Figure 1:
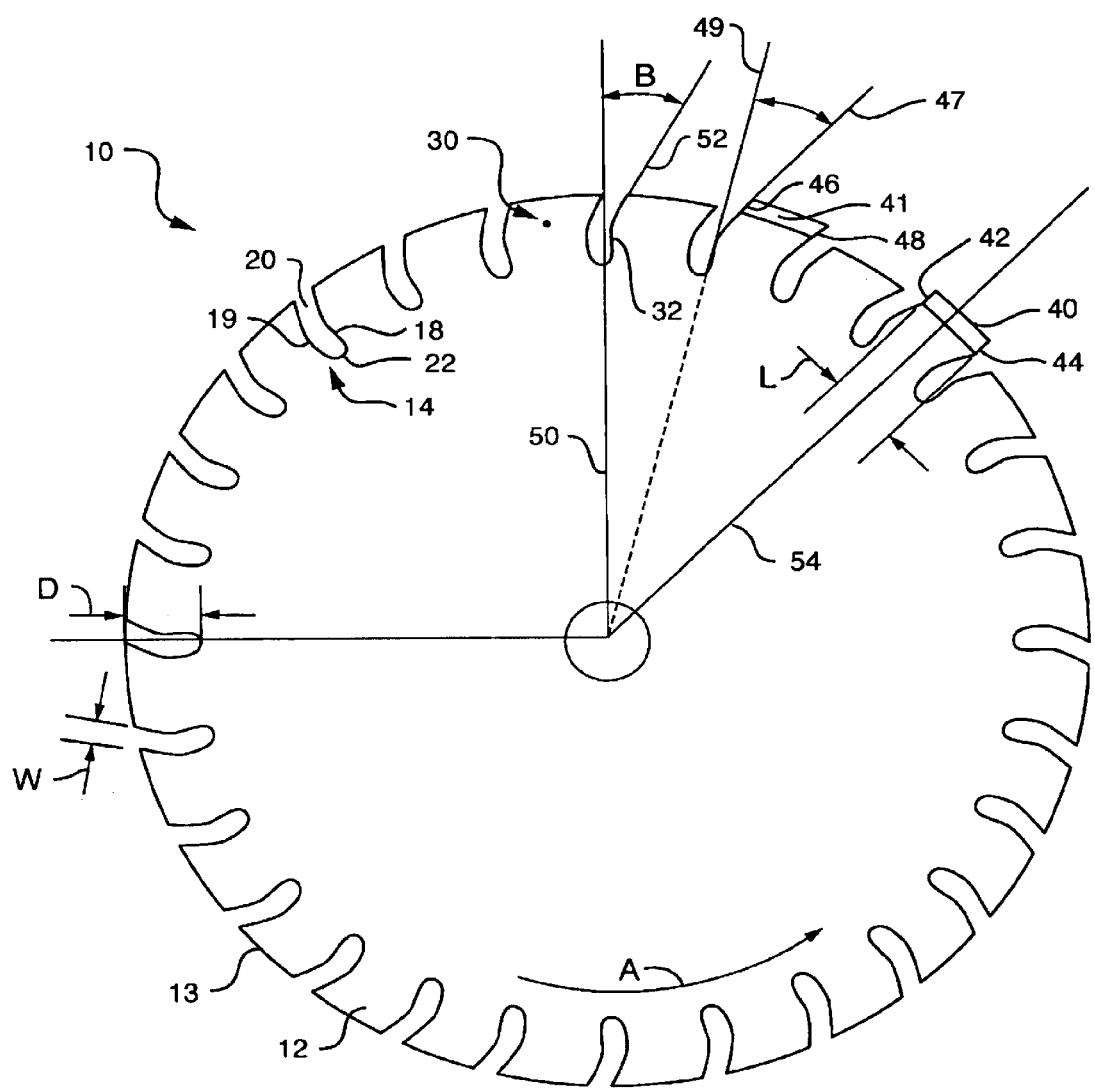
FIG. 1 depicts a circular saw blade of this invention showing several different features of the invention.

There is shown in FIG. 1 a circular saw blade 10 that illustrates many features of the invention. In practice, a commercial saw blade would likely not include each of the features shown in FIG. 1. Saw blade 10 includes circular body 12 having peripheral edge 13. A plurality of curved slots are formed in body 12, such as slot 14. Slot 14 is defined by essentially parallel, continuously-curved sidewalls 18 and 19 that lead away from peripheral edge 13 at opening 20, to closed slot end 22. In this embodiment, the slots are all of the same size and shape, which, as described below, is not a limitation of this invention. The slot sidewalls, such as sidewalls 18 and 19, have a radius of curvature that is preferably in the range of about 1 inch to about 3 inches. In this case, slot 14 has center of curvature 30. The blade is designed to be rotated in a counterclockwise direction as depicted by arrow A. Thus, the center of curvature 30 trails (in the direction of blade rotation) the opening of slot 14. This establishes the direction of the slot curvature relative to the direction of rotation of saw blade 10.

Another feature of saw blade 10 is that the curved slots' outer ends, i.e. where the slots meet the peripheral edge 13 of body 12, in this example lie at an angle to the saw body radius. For example, as shown at slot 32, the sidewalls at the periphery are parallel to line 52 which lies at an angle B relative to radius 50. This angle B is preferably from 0 degrees (meaning that the sidewalls at the saw body periphery are parallel to a radius), up to an angle of about 30 degrees. The slots have a width W of preferably from about 0.125 inches to about 0.250 inches, and a depth D (the distance of the end of the slot from the periphery of the body) of from about 0.5 inches to about 2 inches.

Another aspect of this invention resides in the cutting segments, such as segments 40 and 41, that are fixed to the peripheral edge between adjacent slots. In most cases, there will be a segment between each pair of adjacent slots. The segments comprise diamond abrasive grit embedded in a metal matrix, as is known in the art. The segments preferably have a length of from about 1 inch to about 2 inches in the peripheral direction, and there are preferably from 4 to 75 segments per blade. Generally, the number of segments is determined by the number of slots, which are typically spaced peripherally every 1 to 2 inches around the circumference of the blade. The number of slots and thus the number of segments also depends in part on the diameter of the blade. In the preferred embodiment, the circular body has a nominal diameter of from about 4 inches to about 36 inches, although these are not limitations on the invention.

One type of segment, segment 40, has ends 42 and 44 that are essentially parallel to radius 54 that bisects segment 40. Another type of segment 41 has curved ends 46 and 48 that preferably have the same radius of curvature as the sidewalls of the slots that bound the segment, so that the segment ends effectively continue the slot sidewalls.

Figure 2:
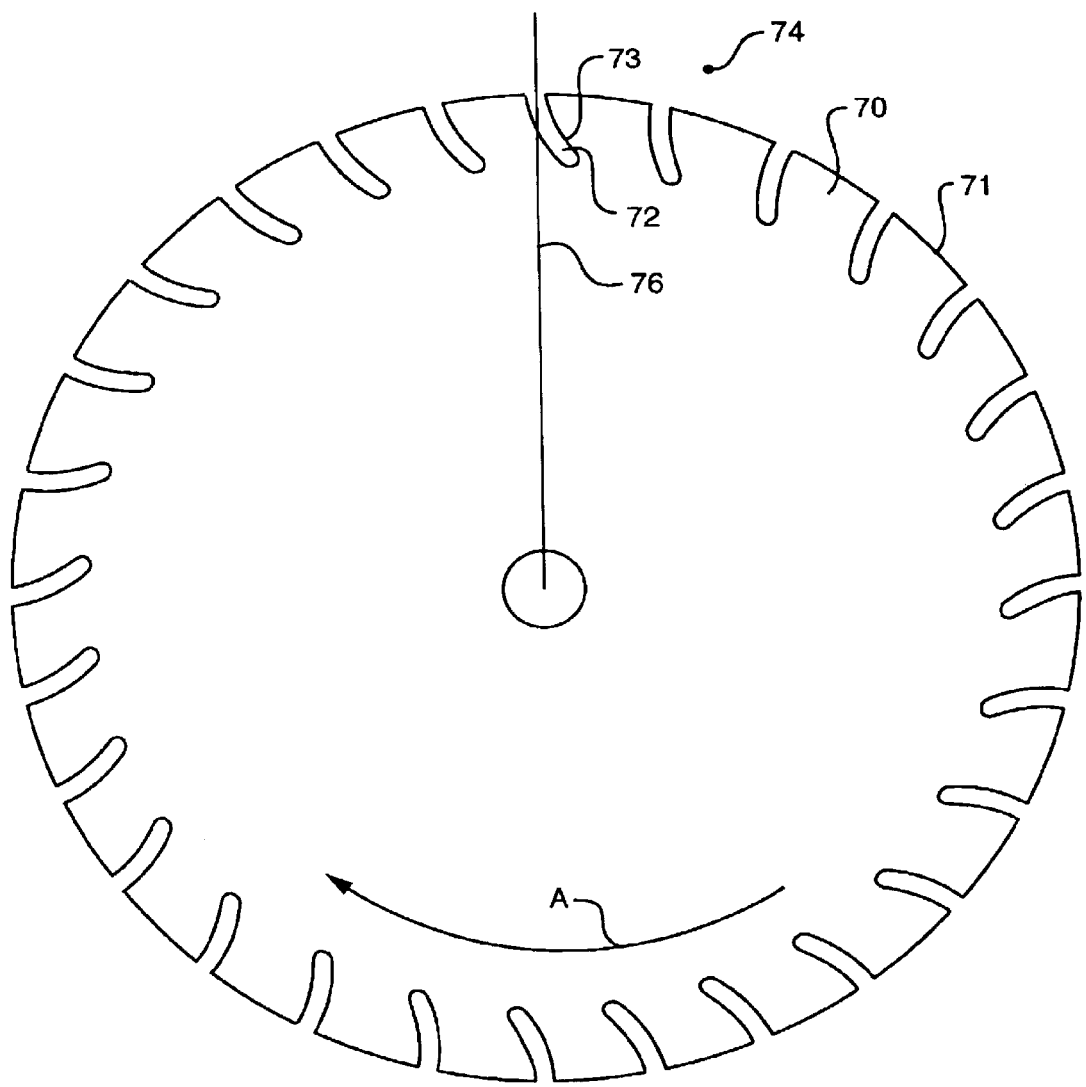
FIG. 2 depicts the preferred embodiment of the saw blade of the invention, having different curved slots than those shown in FIG. 1.

The second basic slot shape of the invention is shown in FIG. 2 in which slot 72 opens to peripheral edge 71 of circular body 70 such that the slot sidewalls are essentially parallel to radius 76 that bisects this opening. This places the end of slot 72 along radius 76. Slots of this type are preferred in the invention. This embodiment also depicts center of curvature 74 of slot 72. This saw blade is designed rotate clockwise in the direction of the arrow A. Thus, the center of curvature leads, or is ahead of, the opening of slot 72.

Figure 3:
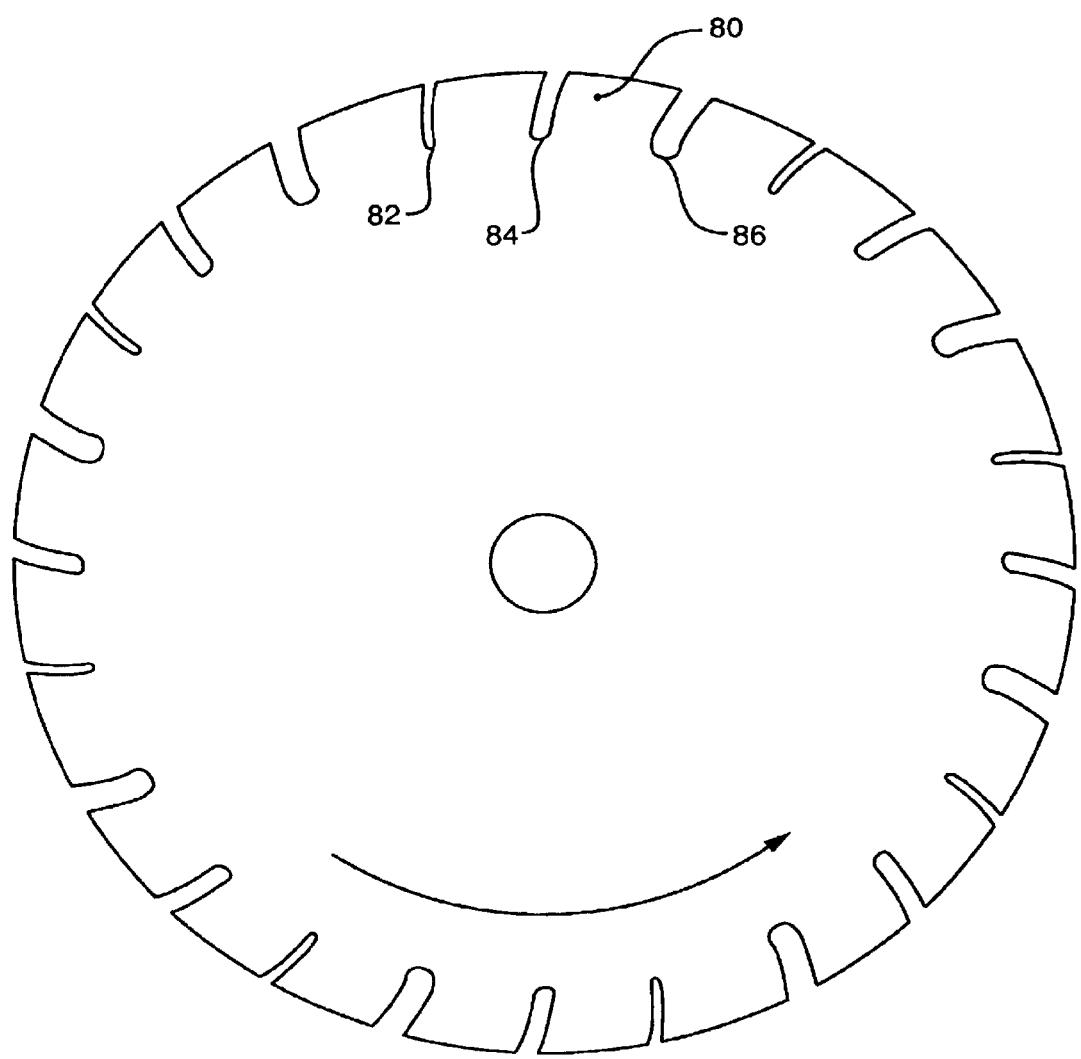
FIG. 3 depicts yet another circular saw blade of this invention with slots of different widths.

Another aspect of this invention is shown in FIG. 3, in which circular body 80 defines slots, such as slots 82, 84 and 86 having different widths. This example shows alternating slots of three different widths, although such is not a limitation of the invention. Each of the slots could have different widths, or there could be two or more slot widths defined in any particular saw body.

As supported by the data set forth below, the curved slots of this invention greatly increase the cutting speed of the saw blade as opposed to a blade having radial slots. These data were taken for an inventive circular saw blade having a nominal diameter of 14 inches, a segment length of 1.250 inches, and a segment height of 0.3 inches, with 28 segments on the blade. The segments were straight-walled, such as depicted by segment 40, FIG. 1, and the slots were arranged to have radial openings, as shown in FIG. 2. The slots had a depth of about 0.89", a width of about 0.20", radii of curvature of the slot walls were 1.525" (inner) and 1.726" (outer), segment length was 1.25", with 28 segments, for a peripheral blade contact area of about 80%.

Test Results

The effectiveness of the invention has been demonstrated through cutting tests. The exact same product formulation (diamond type, grit size, concentration, and bond composition) was tested on a conventional design blade and the new design described above for direct comparison. The conventional blade design was a standard 14" nominal diameter "American Standard" configuration with radial keyhole-shaped slots having a depth of 0.75" including the terminal hole, a width of 0.125", and a terminal hole diameter of 0.250". The segment length was 2", with 19 segments, for a peripheral blade contact area of about 87%. Testing was conducted on cured concrete using a Stihl TS400® high-speed gas powered saw running at 5,400 rpm. The time to create a given cut length was measured, as was segment wear, which was then extrapolated to determine blade life, given that the segment height (depth) is known. Because the results depend on the properties of the material being cut, the test was repeated on two different concrete blocks on two different dates. Results are summarized as follows:

| Design | Test Block | Speed of Cut (inch-feet/min) | Segment Wear Rate (inch wear/ inch-foot cut.) | Projected Life at 0.200" segment depth (inch-feet) |
| --- | --- | --- | --- | --- |
| Standard | A | 2.8 | 0.000029 | 6,967 |
| | B | 3.2 | 0.000066 | 3,016 |
| | Average | 3.0 | 0.000048 | 4,992 |
| Invention | A | 6.7 | 0.000032 | 6,333 |
| | B | 5.3 | 0.000071 | 2,822 |
| | Average | 6.0 | 0.000052 | 4,578 |

These data show 100% increase in speed of cut with the new design, with only 8% reduction of life. This is a very significant speed increase but a barely measurable life reduction.

What is claimed is:

1. A circular saw blade, comprising:
   a circular body having a peripheral edge;
   a plurality of curved slots spaced along the peripheral edge, each slot having an open outer end connecting with the peripheral edge, the outer ends of the slots lying along radii of the body, the slots defined by essentially parallel, continuously-curved sidewalls leading away from the peripheral edge; and
   a cutting segment fixed to the body and extending from the peripheral edge between at least some of the adjacent slots.

2. The circular saw blade of claim 1, wherein adjacent slots are essentially parallel to one another.

3. The circular saw blade of claim 1, wherein the slots extend inward from the peripheral edge by from about 0.5 inches to about 2 inches.

4. A circular saw blade, comprising:
   a circular body having a peripheral edge;
   a plurality of curved slots spaced along the peripheral edge, each slot having an open outer end connecting with the peripheral edge, the outer ends of the slots lying along radii of the body, the slots defined by essentially parallel, continuously-curved sidewalls leading away from the peripheral edge, wherein the center of curvature of each slot is ahead of its open outer end in the direction of blade rotation; and
   a cutting segment fixed to the body and extending from the peripheral edge between each of the adjacent slots, wherein the segments have ends that are essentially parallel to a radius of the body.

5. The circular saw blade of claim 1, wherein the outer ends of the slots are at an angle to radii of the body.

6. The circular saw blade of claim 5, wherein the angle is up to about 30 degrees.

7. The circular saw blade of claim 1, wherein there are from 4 to 75 segments.

8. The circular saw blade of claim 7, where each segment is from about 1 inch to about 2 inches long in the peripheral direction.

9. The circular saw blade of claim 1, wherein the slots all have essentially the same radius of curvature.

10. The circular saw blade of claim 9, wherein the slot radius of curvature is from about 1 inch to about 3 inches.

11. The circular saw blade of claim 1, wherein the slots have a width of from about 0.125 inches to about 0.250 inches.

12. The circular saw blade of claim 1, wherein the circular body has a nominal diameter of from about 4 inches to about 36 inches.

13. The circular saw blade of claim 1, wherein the segments comprise diamond particles in a metal matrix.

14. The circular saw blade of claim 1, wherein the segments have a peripheral length essentially the same as the peripheral distance between the open outer ends of adjacent slots.

15. The circular saw blade of claim 1, wherein the segments have ends that are essentially parallel to a radius of the body.

16. The circular saw blade of claim 1, wherein the segments have curved ends.

17. The circular saw blade of claim 16, wherein the radius of curvature of the segment ends in substantially the same as the radius of curvature of the adjacent slots.

18. The circular saw blade of claim 1, wherein the center of curvature of the slot is behind its open outer end in the direction of blade rotation.

19. The circular saw blade of claim 1, wherein the center of curvature of the slot is ahead of its open outer end in the direction of blade rotation.

20. A circular saw blade, comprising:
   a circular body having a peripheral edge;
   a plurality of curved slots spaced along the peripheral edge, each slot having an open outer end connecting with the peripheral edge, and defined by essentially parallel, continuously-curved sidewalls leading away from the peripheral edge, the slots all having essentially the same radius of curvature and being essentially parallel to one another; and
   a cutting segment fixed to the body and extending from the peripheral edge between each pair of adjacent slots.

* * * * *